US009016803B2

(12) United States Patent
Howell et al.

(10) Patent No.: US 9,016,803 B2
(45) Date of Patent: Apr. 28, 2015

(54) AXLE MOUNTING ASSEMBLIES AND CHILDREN'S PRODUCTS HAVING AXLE MOUNTING ASSEMBLIES

(71) Applicant: Mattel, Inc., El Segundo, CA (US)

(72) Inventors: William R. Howell, Arcade, NY (US); Ross Rumfola, III, Akron, NY (US); Kevin M. Gastle, Boston, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 13/945,349

(22) Filed: Jul. 18, 2013

(65) Prior Publication Data

US 2014/0049015 A1    Feb. 20, 2014

Related U.S. Application Data

(60) Provisional application No. 61/684,089, filed on Aug. 16, 2012.

(51) Int. Cl.
| | |
|---|---|
| *B60B 27/06* | (2006.01) |
| *B60B 7/00* | (2006.01) |
| *B60B 7/04* | (2006.01) |
| *B60B 7/06* | (2006.01) |
| *B60B 7/14* | (2006.01) |

(52) U.S. Cl.
CPC .............. *B60B 27/065* (2013.01); *B60B 7/0013* (2013.01); *B60B 7/04* (2013.01); *B60B 7/066* (2013.01); *B60B 7/14* (2013.01); *B60B 2900/3312* (2013.01)

(58) Field of Classification Search
CPC ........ B60B 37/04; B60B 37/06; B60B 27/06; B60B 27/065
USPC ................ 301/111.01, 111.07, 112, 121–122
See application file for complete search history.

(56) References Cited

U.S. PATENT DOCUMENTS

| | | | |
|---|---|---|---|
| 1,540,508 | A | 6/1925 | White |
| 2,078,411 | A | 4/1937 | Richardson |
| 2,243,923 | A | 6/1941 | Swanstrom |
| 2,477,429 | A | 7/1949 | Swanstrom et al. |
| 2,567,864 | A | 9/1951 | Becker |
| 2,712,262 | A | 7/1955 | Knohl |
| 2,986,188 | A | 5/1961 | Karp et al. |
| 3,037,542 | A | 6/1962 | Boyd |
| 3,145,751 | A | 8/1964 | Boots |
| 3,176,747 | A | 4/1965 | Nenzell |
| 3,868,806 | A | 3/1975 | Dey |
| 4,015,650 | A | 4/1977 | Anderson |
| 4,026,341 | A | 5/1977 | Menke |
| 4,043,685 | A | 8/1977 | Hyams |
| 4,193,435 | A | 3/1980 | Charles et al. |
| 4,295,766 | A | 10/1981 | Shaw |
| 4,513,981 | A | 4/1985 | DeGraaff et al. |
| 5,096,349 | A | 3/1992 | Landy et al. |
| 5,137,406 | A | 8/1992 | Cosenza |

(Continued)

*Primary Examiner* — Jason Bellinger
(74) *Attorney, Agent, or Firm* — DASCENZO Intellectual Property Law, P.C.

(57) ABSTRACT

Axle mounting assemblies including an object, an axle, and a bushing assembly that operatively couples the object to the axle. The bushing assembly includes a bushing portion that extends at least partially through and engages a hub of the object, a fastener operatively retained relative to a bore defined by the bushing portion and positioned around the end region of the axle, and a force-receiving portion configured to selectively receive an installation force for operatively positioning the fastener over the end region of the axle.

24 Claims, 7 Drawing Sheets

(56) References Cited

U.S. PATENT DOCUMENTS

| | | |
|---|---|---|
| 5,143,427 A | 9/1992 | Dick |
| 5,603,555 A | 2/1997 | Dickey et al. |
| 5,716,107 A | 2/1998 | Parker et al. |
| 5,902,018 A | 5/1999 | Owen et al. |
| 6,099,083 A | 8/2000 | Logan |
| 6,260,930 B1 * | 7/2001 | Peres ............................ 301/122 |
| 6,354,670 B1 | 3/2002 | Cheng |
| 6,361,121 B1 | 3/2002 | Morris |
| 6,375,274 B1 | 4/2002 | Morris |
| 6,508,518 B1 | 1/2003 | Owen et al. |
| 6,578,931 B1 | 6/2003 | Anderson |
| 6,637,835 B2 | 10/2003 | Morris |
| 6,755,265 B2 | 6/2004 | Huntsberger et al. |
| 6,769,850 B2 | 8/2004 | Lay |
| 6,771,034 B2 | 8/2004 | Reile et al. |
| 6,910,742 B2 | 6/2005 | Flood et al. |
| 6,938,964 B2 | 9/2005 | Flood et al. |
| 7,108,335 B2 | 9/2006 | Morris |
| 7,207,762 B2 | 4/2007 | Teal |
| 7,377,597 B2 | 5/2008 | Morris |
| 7,568,753 B2 | 8/2009 | Arendt et al. |
| 7,905,305 B2 | 3/2011 | Lucas et al. |
| 7,939,008 B2 | 5/2011 | Arendt et al. |
| 8,147,005 B2 | 4/2012 | Morris |
| 8,164,429 B2 | 4/2012 | Reynolds et al. |
| 2003/0080528 A1 | 5/2003 | Damon et al. |
| 2010/0059968 A1 | 3/2010 | Asbach et al. |
| 2011/0084545 A1 | 4/2011 | Chen |
| 2012/0074663 A1 | 3/2012 | Parker et al. |
| 2012/0153586 A1 | 6/2012 | Morris |

* cited by examiner

AXLE MOUNTING ASSEMBLIES AND CHILDREN'S PRODUCTS HAVING AXLE MOUNTING ASSEMBLIES

RELATED APPLICATION

The present application claims priority under 35 U.S.C. §119(e) to U.S. Provisional Patent Application Ser. No. 61/684,089, which is entitled "AXLE MOUNTING ASSEMBLIES AND CHILDREN'S PRODUCTS HAVING AXLE MOUNTING ASSEMBLIES," which was filed on Aug. 16, 2012, and the disclosure of which is hereby incorporated by reference.

FIELD

The present disclosure relates generally to children's ride-on vehicles, and more particularly to axle mounting assemblies for children's ride-on vehicles.

BACKGROUND

Children's products often have components that are mounted to axles. For example, children's ride-on vehicles, which are vehicles that are sized and designed for use by children sitting on the seats of the vehicles, frequently include components that are mounted on axles. Children's ride-on vehicles may be electrically powered with motors, or they may be child-powered (i.e., manually powered), such as with pedals or simply by the child pushing against the ground with his/her feet. Due to the size of typical children's ride-on vehicles, they often are sold in a partially assembled state, and a parent or other individual performs final assembly of various parts after purchase of the ride-on vehicle. Illustrative, non-exclusive examples of components that may be required to be installed on a children's ride-on vehicle by a user include wheels, steering wheels, steering linkages, and/or pedals. These examples all require attaching a structure (e.g., wheel, steering wheel, steering linkage, pedal) to an axle, rod, or similar mounting shaft or projection.

Figures 1, 2, 3, 4:
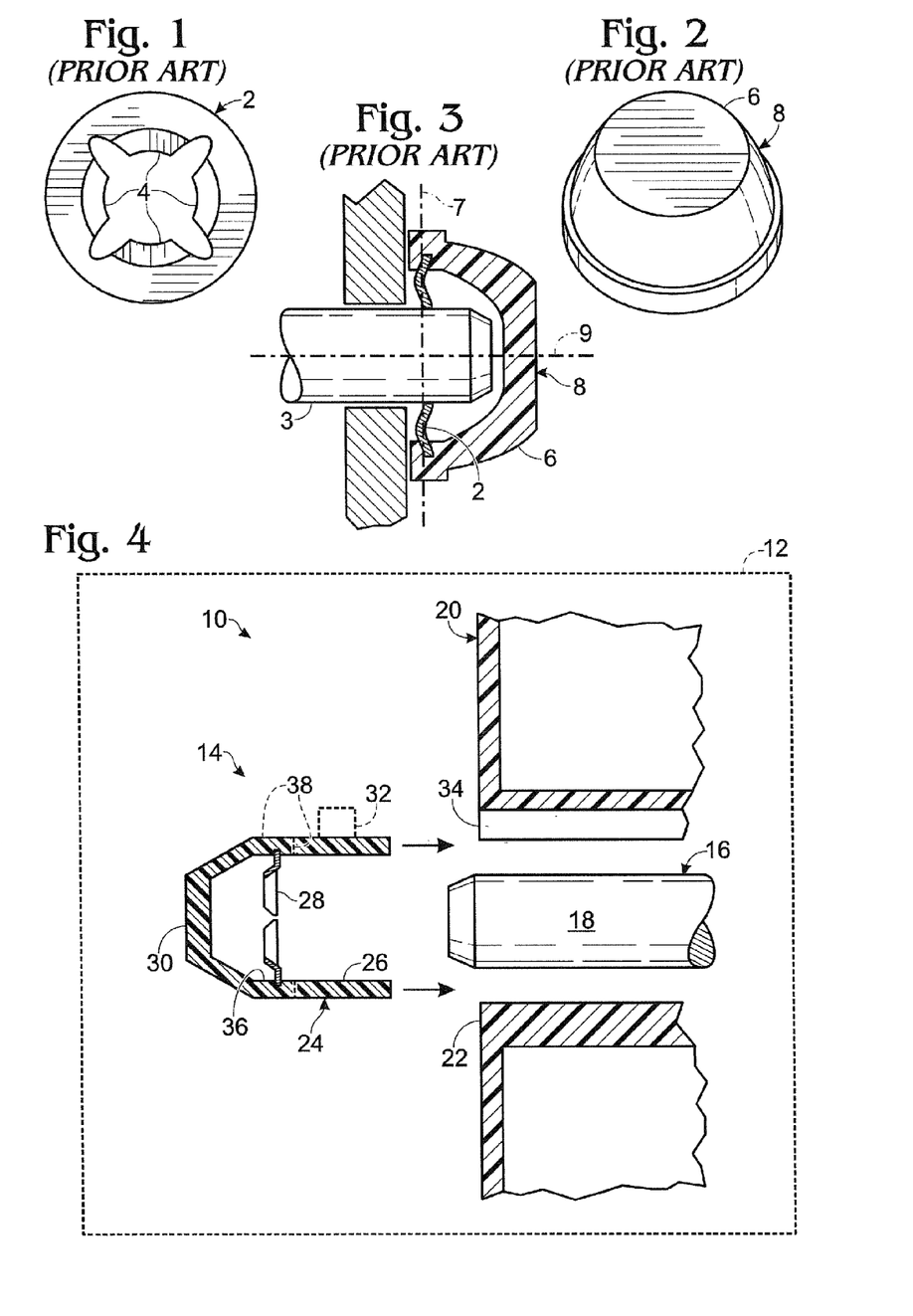
FIG. 1 is a plan view of a prior art Pushnut-style fastener.
FIG. 2 is a perspective view of a prior art cap nut, including a Pushnut-style fastener.
FIG. 3 is a cross-sectional side view of a prior art cap nut, including a Pushnut-style fastener, secured over the end region of an axle, thereby securing an object to the axle.
FIG. 4 is a schematic cross-sectional, exploded view representing illustrative, non-exclusive examples of axle mounting assemblies according to the present disclosure.

Using the wheel example, one prior art system for securing a wheel to an axle includes utilizing a threaded axle and nut. The axle is inserted into, and in many instances through, the wheel, and a nut is secured to the axle, thereby retaining the wheel in position on the axle. However, threaded and/or other specially machined or shaped axles are comparatively expensive to manufacture and may be more prone to damage than a non-threaded or other more simple axle. Accordingly, non-threaded axles (i.e., essentially cylindrical rods) and non-threaded fasteners may be used, such as a Pushnut® fastener, which is a branded fastener sold by Palnut, and referred to herein as a Pushnut-style fastener 2. An example of a Pushnut-style fastener 2 is illustrated in FIG. 1. The Pushnut-style fastener is pushed or otherwise forced over (i.e., around) the end region of a rod, axle, or stud (depending on the application), and internally facing flanges 4 of the Pushnut-style fastener bite into or otherwise firmly engage the rod, preventing (or at least restricting) removal of the Pushnut-style fastener from the rod. Described in other terms, the end region of the rod, axle, stud, etc. is inserted at least partially through the fastener's central aperture, with flanges of the fastener engaging the end region to resist separation of the fastener from the rod.

To facilitate installation, a Pushnut-style fastener may be housed in a cap, or housing, 6 so that a user may use a hammer to operatively push/force/hammer the fastener onto the end of the rod. An example of this type of assembly may be referred to as a cap nut 8 and is shown in FIG. 2, with the actual Pushnut-style fastener 2 being positioned within the opening of the cap 6, as seen in FIG. 3. As shown, the fastener 2 and axle 3 are axially aligned, with the fastener defining a plane 7 that extends perpendicular to the longitudinal axis 9 of the end region of the axle that is inserted through the fastener's central aperture.

A challenge with Pushnut-style fasteners and cap nuts is that parents or other users may hammer or otherwise force them onto an axle in a crooked or other inclined configuration instead of the desired configuration of FIG. 3. Improper installation of Pushnut-style fasteners and cap nuts may reduce the strength of the engagement between the fastener/cap nut and the axle, which in turn may permit the fastener or cap nut to separate from the axle during use of the children's ride-on vehicle or other product. Additionally or alternatively, improper installation of a Pushnut-style fastener and/or cap nut may damage the fastener or cap nut, and in many embodiments, an improperly installed fastener or cap nut cannot be readily removed and reinstalled. The present disclosure is directed to improved axle mounting assemblies for securing cap nuts and related fasteners to axles and other shafts of products, such as children's products and/or children's ride-on vehicles.

SUMMARY OF THE DISCLOSURE

The present disclosure is directed to axle mounting assemblies and children's products that have axle mounting assemblies. Children's ride-on vehicles are an illustrative, non-exclusive example of a children's product that may include an axle mounting assembly according to the present disclosure.

Axle mounting assemblies according to the present disclosure include an object, an axle, and a bushing assembly that operatively couples the object to the axle. The object includes a hub, and the axle has an end region. The bushing assembly includes a bushing portion that extends at least partially through the hub, engages the hub, and defines a bore through which the axle extends. The bushing assembly further includes a fastener operatively retained relative to the bore and positioned around the end region of the axle, and a force-receiving portion that is configured to selectively receive an installation force for operatively positioning the fastener over the end region of the axle.

In some embodiments, the force-receiving portion includes a cover that is coupled to the bushing portion and that extends around the fastener. In some embodiments, the cover defines an engagement surface for receiving an installation force, and the cover transmits the installation force to the bushing portion without directly transmitting the installation force to the fastener. In other embodiments, the cover defines an engagement surface for receiving an installation force, and the cover transmits the engagement force directly to the fastener or directly to the fastener and the bushing portion.

DESCRIPTION

Axle mounting assemblies and children's products including axle mounting assemblies are schematically illustrated in FIG. 4 and are indicated generally at 10 and 12, respectively. Children's product 12 may take any suitable form and may represent any type of children's product that includes at least one axle mounting assembly 10. Illustrative, non-exclusive examples of children's products 12 according to the present disclosure include toys, toy vehicles, children's ride-on vehicles, battery-powered children's ride-on vehicles, manually powered children's ride-on vehicles, play sets, toy play structures, and any other product that includes one or more objects that are mounted to an axle, rod, or stud for rotational movement with the axle, rod, or stud, or for rotational movement relative to the axle, rod, or stud. Children's products 12 according to the present disclosure may, but are not required to, include more than one axle mounting assembly 10. As an illustrative, non-exclusive example, when children's product 12 is a children's ride-on vehicle with a plurality of wheels, each of the wheels may be secured for rotational movement relative to the body of the children's ride-on vehicle by an axle mounting assembly, such as by an axle mounting assembly 10.

Axle mounting assemblies 10 additionally or alternatively may be described as or referred to as rod mounting assemblies 10 or stud mounting assemblies 10. As seen with reference to the schematic cross-sectional, exploded view of FIG. 4, axle mounting assemblies 10 according to the present disclosure include a bushing assembly 14, an axle 16 having an end region 18, and an object 20 including a hub 22. As an illustrative, non-exclusive example, object 18 may be and/or include a wheel, a steering wheel, a steering linkage, a pedal, or any other component or part of a children's product 12 that is mounted to an axle 16. Axle 16 additionally or alternatively may be, or may be described as or referred to as, a rod 16, a shaft 16, and/or a stud 16. Typically, although not required, axle 16 is generally cylindrical with a circular cross-sectional profile; however, it is within the scope of the present disclosure that other configurations of axles 16 may be used. Hub 22 may additionally or alternatively be referred to as an object-mount, cap, and/or axle-receiving portion of object 20. It is within the scope of the present disclosure that hub 22 may be formed integrally with object 20, may form a portion of object 20, may be secured to object 20, and/or may be a separate structure from object 20.

The bushing assembly 14 of axle mounting assemblies 10 includes a bushing portion 24 that defines a bore 26, into and/or through which the end region 18 of the axle 16 extends when the bushing assembly 14 is operatively positioned relative to the axle 16. The bushing assembly 14 also includes a fastener 28 that is operatively retained relative to the bore 26 to be operatively positioned around the end region 18 of the axle 16 when the bushing assembly 14 is operatively coupled to the axle 16. The bushing assembly 14 also includes an installation-force receiving-portion 30 that is configured to selectively receive an installation force for operatively positioning (i.e., forcing) the fastener 28 around the end region 18 of the axle 16, such that the end region of the axle extends into and/or through the fastener. Installation-force receiving portion 30 additionally or alternatively may be referred to as a force-receiving portion 30 of the bushing assembly.

As discussed and/or illustrated in more detail herein, force-receiving portion 30 may be an integral portion of the bushing assembly, may be a separate structure that is mechanically or otherwise secured or coupled to the fastener, bushing, and/or other portion(s) of the bushing assembly, may be a protective cover or housing that extends over/around the fastener, may be a reinforced structure, may cooperate with the bushing to enclose and/or house the fastener, may directly engage the fastener, may not directly engage the fastener, may directly engage the bushing but not the fastener, and/or may transmit installation forces directly or indirectly to the bushing and/or to the fastener.

Fastener 28 may have any suitable configuration, such that it is configured to restrictively retain the bushing assembly 14 to the axle 16 when the fastener extends around the end portion of the axle. As illustrative, non-exclusive examples, the fastener 28 may be or include a Pushnut-style fastener, a lock washer, a lock nut, a ring with internally directed teeth, a cap that includes a lock washer or nut, or a cap nut that includes one of the aforementioned types of fasteners.

The bushing portion 24 of the bushing assembly 14 essentially is a hollow portion that defines the bore 26. Bore 26 typically is sized so that bushing portion 24 extends around the end region 18 of the axle 16 with limited clearance, typically in close proximity to the end region of the axle that extends at least partially, if not completely, through the bore. In some embodiments, the bushing portion 24 also is configured to operatively engage the object 20 so that the object 20 and bushing assembly 14 will rotate together (i.e., as a unit) with the axle, when the bushing assembly 14 is properly positioned over the end region 18 of the axle 16. Accordingly, in FIG. 4, bushing portion 24 is schematically illustrated with an optional hub engagement portion 32, and object 20 is schematically illustrated with an optional bushing engagement portion 34, which may be defined by the hub 22 of the object 20. Although not required to all embodiments, the bushing portion may include more than one hub engagement portion 32, such as a plurality of spaced-apart hub engagement portions that are positioned radially around the bushing portion. The one or more hub engagement portions 32, when present, may respectively inter-engage with the object, such as with one or more corresponding bushing engagement portions 34 of the object. However, it also is within the scope of the present disclosure that a bushing assembly 14 does not include a hub engagement portion 32 for operatively coupling bushing assembly 14 in rotational movement with the object 20. For example, in the example of object 20 being a pedal that is mounted to a crank, the pedal is required to rotate relative to the crank, yet bushing assembly 14 still couples the pedal to the crank.

In some embodiments, bushing portion 24 defines an alignment cavity 36 within which the fastener 28 is positioned, housed, and/or otherwise retained. The alignment cavity 36, when present, is at least partially coextensive with the bore 26 and, in some embodiments, may permit for selective insertion and removal of the fastener into and from the alignment cavity 36. Additionally or alternatively, a component that is separate and apart from the bushing portion 24 but that is configured to be operatively coupled to the bushing portion may define an alignment cavity 36. For example, as schematically and optionally indicated with dashed lines in FIG. 4, a cover 38 may define the alignment cavity 36, as well as the installation-force receiving-portion 30. In some embodiments, the alignment cavity 36 may be specifically configured, shaped, or keyed, for receipt of the fastener 28, such that the fastener may not be, or at least may not easily be, positioned improperly within the alignment cavity.

In some embodiments, the cover may be configured to be selectively coupled to and decoupled from the bushing portion 24. In some embodiments, the cover may be configured to be selectively coupled to the bushing portion, but not to be decoupled from the bushing portion once it has been coupled thereto. In some embodiments, the cover may be configured to be selectively coupled to the bushing portion, but may resist decoupling from the bushing portion once it has been coupled thereto. The latter two optional examples may be desirable to prevent, restrict, or otherwise discourage an end user, such as a parent of a child user of a children's product 12, from being able to disassemble the axle mounting assembly 10 after it has been initially assembled. In some embodiments, the cover may be coupled to the bushing portion by the manufacturer, rather than permitting an end user, such as a parent, to assemble the bushing assembly. Such a configuration may be utilized, so that the end user does not attempt to replace, and perhaps improperly replace, the fastener 28. In some embodiments, the cover is and/or includes the force-receiving portion 30.

When the fastener 28 is operatively positioned and retained relative to bushing portion 24, such as within the alignment cavity 36, the central axis of the fastener 28 is co-linear (i.e., axially aligned) with the central axis of the bore 26 and with the longitudinal axis of the axle 16 when the bushing assembly 14 is operatively positioned relative to the axle 16. Accordingly, a user may position the bushing assembly 14 around the end region 18 of the axle 16, with the bushing portion 24 maintaining a straight alignment of the bushing assembly 14 relative to the axle 16 and thus maintaining a straight alignment of the fastener 28 relative to the axle 16. In embodiments that include a hub engagement portion 32, it will appropriately mate with the corresponding bushing engagement portion 34 as the bushing portion is positioned over the end region of the axle. As a result of the fastener 28 being a component of the bushing assembly 14, and as long as the bushing portion 24 or bore 26 is longer than a threshold length, the fastener 28 cannot engage the axle 16 in a crooked orientation. Once the bushing assembly 14 initially is positioned around the end region 18 of the axle 16, when a user imparts an installation force to the force-receiving portion 30, such as from a hammer, the bushing assembly 14 will translate further on to the axle 16, and the fastener 28 will maintain an appropriate alignment with the axle 16 so that it is inserted over the end region 18 of the axle 16 in a straight, proper manner. Illustrative, non-exclusive examples of a threshold length of the bushing portion 24 or the bore 26 include, but are not limited to, lengths that are greater than 0.5, 0.7, 0.9, 1, 1.2, 1.4, 1.6, 1.8, 2, 2.5, or 3 times the diameter of the axle. Illustrative, non-exclusive examples of the limited clearances (i.e., differences in diameters) between the inner surface of bore 26 and the outer surface of the end region 18 of the axle 16 include, but are not limited to, clearances of less than 5 mm, less than 4 mm, less than 3 mm, less than 2 mm, and less than 1 mm, as well as clearances that are less than 10%, less than 5%, less than 3%, less than 2%, and less than 1% of the diameter of the outer surface of the end region of the axle. Other threshold lengths and limited clearances that are outside of the enumerated values herein also are within the scope of the present disclosure.

In some embodiments, the axle 16, or at least the end region thereof that engages fastener 28, bushing assembly 14, and/or bushing portion 24, does not include, or is free of, a circumferential groove that extends about the end region 18 of the axle 16. Additionally or alternatively, in some embodiments, the axle is free of threads within the end region 18 of the axle 16 and/or has a constant diameter within the end region of the axle.

Turning now to FIGS. 5-15, illustrative non-exclusive examples of axle mounting assemblies 10 and component parts thereof are illustrated. Where appropriate, the reference numerals from the schematic illustration of FIG. 4 are used to designate corresponding parts of the examples of FIGS. 5-15; however, the examples of FIGS. 5-15 are non-exclusive and do not limit axle mounting assemblies 10 to the illustrated embodiments of FIGS. 5-15. That is, axle mounting assemblies are not limited to the specific embodiments illustrated, and axle mounting assemblies 10 may incorporate any number of the various aspects, configurations, characteristics, properties, etc. of the axle mounting assemblies that are illustrated in and discussed with reference to the schematic representation of FIG. 4 and/or the embodiments of FIGS. 5-15, as well as variations thereof, without requiring the inclusion of all such aspects, configurations, characteristics, properties, etc.

Figure 7:
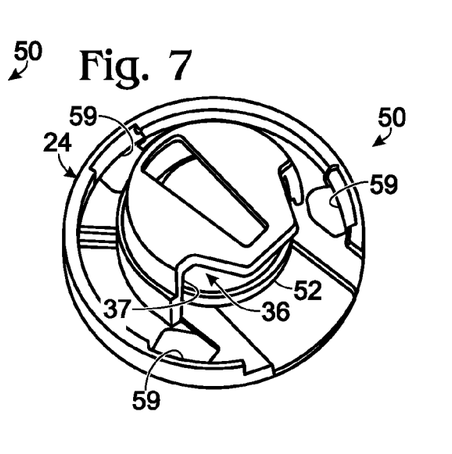
FIG. 7 is an isometric end view of the cap nut assembly of FIG. 5.
Figure 8:
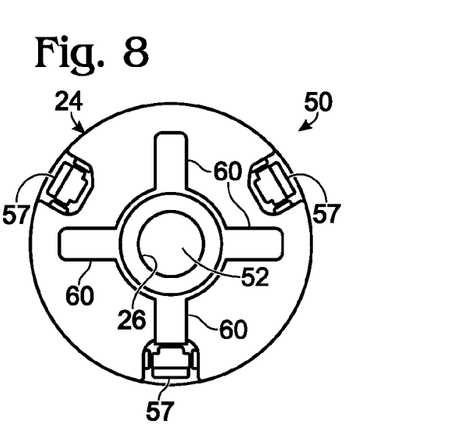
FIG. 8 is an end view of the cap nut assembly of FIG. 5 viewed from the end distal the cap nut.
Figure 9:
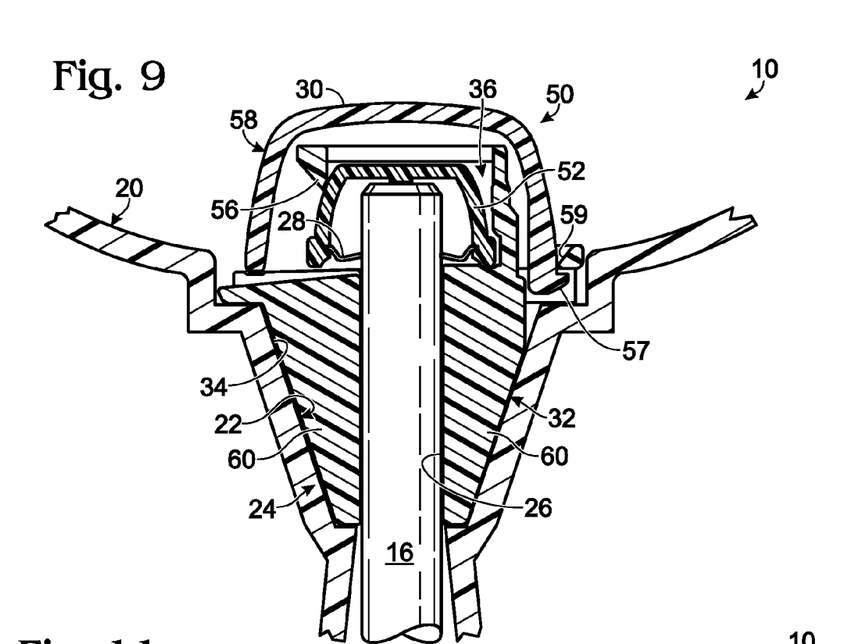
FIG. 9 is a fragmentary cross-sectional side view of an illustrative, non-exclusive example of an axle mounting assembly according to the present disclosure, including the cap nut assembly of FIG. 5 with an optional cover.

A first illustrative, non-exclusive example of an axle mounting assembly 10 is illustrated in FIGS. 5-9. More specifically, FIGS. 5-8 illustrate an illustrative, non-exclusive example of a bushing assembly 14 of an axle mounting assembly 10, with the bushing assembly 14 in the form of a cap nut assembly 50. FIG. 9 illustrates cap nut assembly 50 together with an axle 16, and an object 20 (in the form of a wheel 20), thus defining an axle mounting assembly 10.

Figure 5:
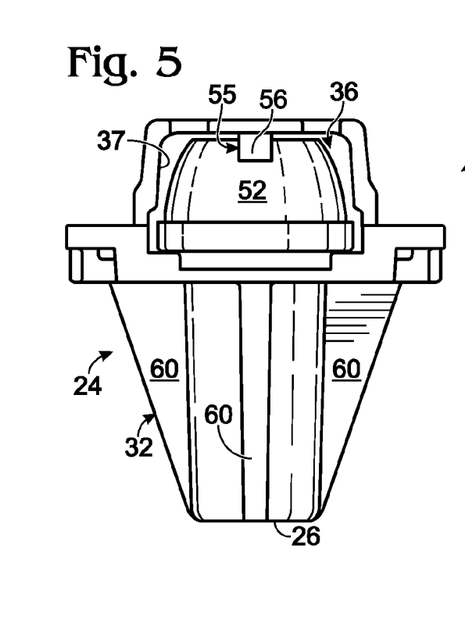
FIG. 5 is a side view of an illustrative, non-exclusive example of a cap nut assembly according to the present disclosure.
Figure 6:
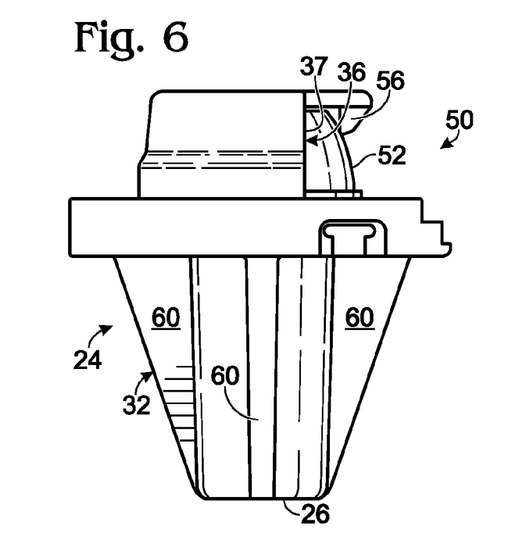
FIG. 6 is a side view of the cap nut assembly of FIG. 5 viewed from a transverse angle to FIG. 5.

As perhaps best seen in FIGS. 5-7, cap nut assembly 50 includes a bushing portion 24 and a cap nut 52 that includes a Pushnut-style fastener 28 (as shown in cross-section in FIG. 9). Although not required, cap nut 52 may be a conventional or other off-the-shelf cap nut, such as the cap nut shown in FIG. 2. The bushing portion 24 defines an alignment cavity 36 with an opening 37 through which cap nut 52 may be selectively inserted into and removed from the alignment cavity.

Bushing portion 24 is also shown with an optional projection 55 that extends partially across the opening of the alignment cavity to restrict unintentional removal of the cap nut from the alignment cavity. In the specific example of cap nut assembly 50, the projection 55 defines a resilient tab 56 for selectively retaining the cap nut 52 within the alignment cavity 36. By "restrict unintentional removal," it is meant that the cap nut cannot be readily removed from the alignment cavity, such as by rotating or shaking the bushing assembly, and instead intentional positioning of the cap nut and/or deflection of the projection is needed to remove the cap nut from the alignment cavity. Accordingly, during assembly, the cap nut 52 is inserted into the alignment cavity 36 until the resilient tab 56 snaps or otherwise extends over the outer edge of the cap nut 52, thereby retaining it in place and properly aligned with the bore 26 of the bushing portion 24.

As seen in FIG. 9, cap nut assembly 50 also includes a force-receiving-portion 30 in the form of a cover 58 that is positioned over/around the alignment cavity 36 and the cap nut 52 and that is coupled to the bushing portion 24. Cover 58 additionally or alternatively properly may be described as cooperating with the bushing portion to enclose, or encapsulate, the alignment cavity and any cap nut within the alignment cavity. Although not required, cover 58 (when present) may restrict access to the alignment cavity and cap nut and further may prevent removal of the cap nut from the alignment cavity. Cover 58 may be an illustrative, non-exclusive example of the previously discussed cover 38.

Cover 58, when present, may be removably coupled to the bushing assembly, such as to bushing portion 24 thereof, by any suitable structure. An illustrative, non-exclusive example is shown in FIGS. 7-9 in the form of a plurality of resilient tabs, or feet, 57 that are resiliently received into a corresponding plurality of slots or receivers 59 on the bushing portion. Other constructions, including threads and snap-fit mechanisms, may be utilized. When selectively secured to the bushing portion 24, the cover 58 does not engage the cap nut 52 or the portion of the bushing portion 24 (distal axle 16) that extends over the cap nut 52 and that defines the alignment cavity 36. Accordingly, when the cap nut assembly 50 is properly positioned relative to a corresponding axle 16 and a user hammers on the cover 58, the forces are directed to the bushing portion 24 and not directly to the cap nut 52, thereby removing a potential for damage or misalignment of the cap nut 52 during installation of the cap nut assembly 50 on a corresponding axle 16. This construction is not required to all embodiments, as it also is within the scope of the present disclosure that the cover, when present, directly engages the cap nut and/or retains direct contact between the cap nut with both the cover and the bushing portion. It also is within the scope of the present disclosure that a cap nut assembly 50 and/or axle mounting assembly 10 may not include a cover 38 or 58.

In the illustrated example of cap nut assembly 50, the bushing portion 24 is configured to mate with the internal hub of a wheel as seen in FIG. 9, so that the wheel will operatively rotate together with the axle. Specifically, the hub engagement portion 32 of the bushing portion 24 includes four triangular wings 60 that mate with corresponding bushing engagement portions 34 of the wheel's hub. Accordingly, the wheel will rotate together with the cap nut assembly 50 and the corresponding axle. Wings 60 additionally or alternatively may be described as or referred to as flanges 60 or webbings 60. It is within the scope of the present disclosure that wings 60, when present, may have other shapes, sizes, and/or orientations, and that a lesser or greater number of wings may be utilized.

Figure 10:
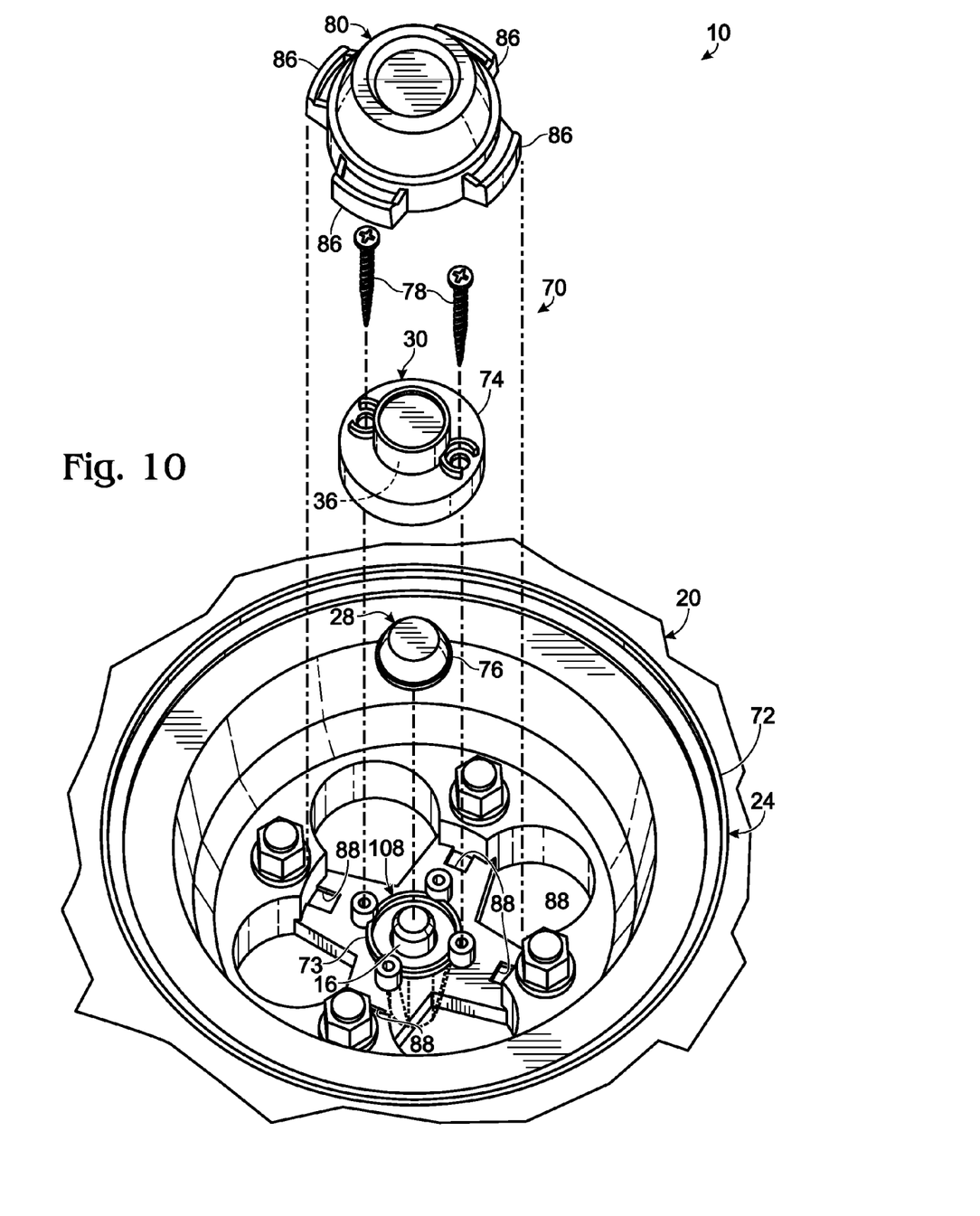
FIG. 10 is an exploded, fragmentary isometric side view of another illustrative, non-exclusive example of an axle mounting assembly according to the present disclosure.
Figure 11:
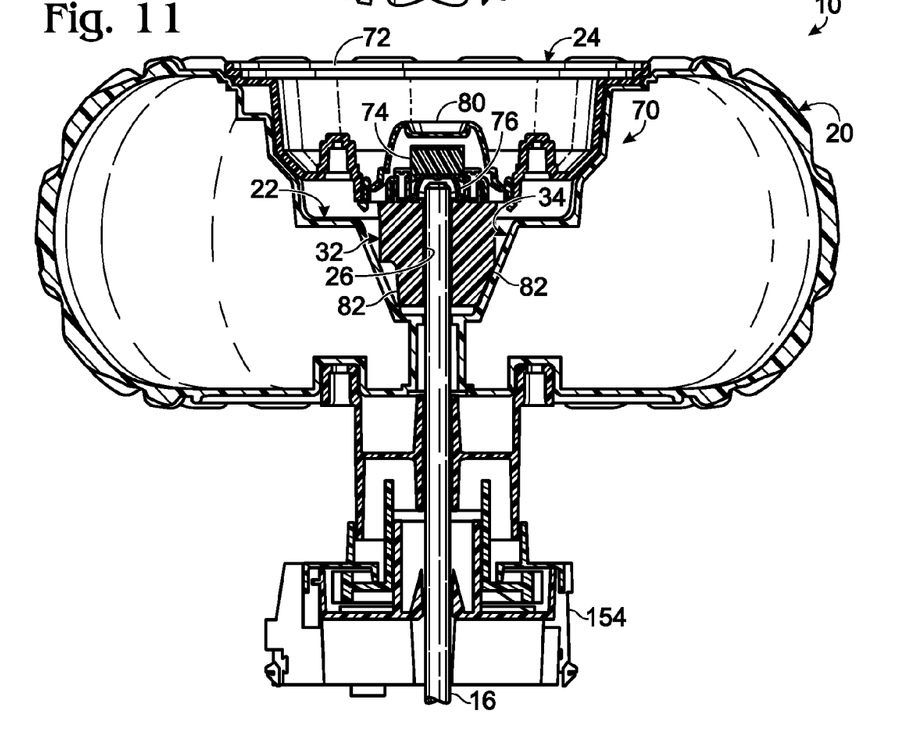
FIG. 11 is a cross-sectional side view of the axle mounting assembly of FIG. 10, shown together with a corresponding motor housing.
Figure 12:
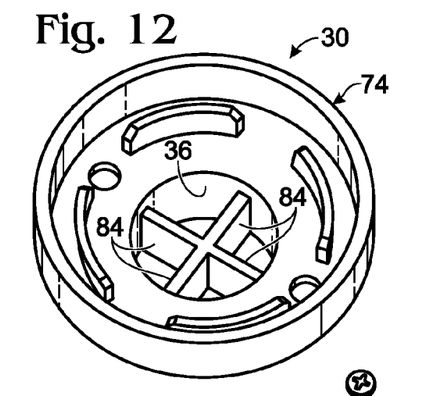
FIG. 12 is an isometric view of an underside of the cover of the cap nut assembly of the axle mounting assembly of FIG. 10.

A second illustrative, non-exclusive example of an axle mounting assembly 10 is illustrated in FIGS. 10-12. The axle mounting assembly of FIGS. 10-12 includes a bushing assembly 14 in the form of a cap nut assembly 70. The cap nut assembly 70 includes a bushing portion 24, an installation-force receiving-portion 30 in the form of an inner cover 74, a fastener 28 in the form of a cap nut 76, a pair of screws 78 (perhaps best seen in FIG. 10), and an outer cover 80.

The bushing portion 24 of FIGS. 10-12 is configured to mimic, or resemble, the wheel, or rim portion, of a full-sized vehicle's wheel/tire assembly and includes optional faux, or simulated, lug nuts. That is, the bushing portion 24 includes structure that is distinguished from the portion of the wheel 20 that is configured to mimic, or resemble, a rubber tire. Accordingly, the bushing portion of cap nut assembly 70 may be described as including, or defining, a rim portion 72 of the axle mounting assembly or overall wheel assembly. The bushing portion 24 includes a hub engaging portion 32 in the form of wings 82 that are configured to engage and mate with corresponding bushing engagement portions 34 of the associated wheel 20. The bushing portion also defines the bore 26, as best seen in FIG. 11.

The bushing portion of cap nut assembly 70 also includes an optional cap nut alignment retainer 108 in the form of a circular lip 73 that extends around and adjacent to the bore 26, and within which the cap nut 76 is positioned. The circular lip facilitates operative alignment of the cap nut 76 with the bore 26 of the bushing portion 24. Once aligned, the lip restricts translation of the cap nut relative to the surface of the bushing portion upon which the cap nut is seated. While illustrated as a circular lip, other suitable structures, such as a discontinuous circle, spaced projections, ribs, grooves, and the like may be used. Screws 78 (or another suitable fastener) are used to secure the inner cover 74 to the bushing portion 24, thereby retaining the cap nut 76 in operative alignment with the bore 26, and thus with the end region of the associated axle. The inner cover 74 is configured to receive an installation force, such as from a hammer, for operatively securing the cap nut 76 over the end region of the associated axle 16, and thus operatively securing the cap nut assembly 70 to the wheel 20.

In contrast to the cap nut assembly 50 of FIGS. 5-9, the installation force applied to the inner cover 74 of cap nut assembly 70 of FIGS. 10-12 is directly transmitted to the cap nut 76. In other words, the inner cover 74 of cap nut assembly 70 defines an alignment cavity 36 that is configured so that the cap nut 76 engages the inside end surface of the inner cover. More specifically, as seen in FIG. 12, the inner cover includes webs 84 that are positioned to engage the outer end surface of the cap nut so that when an installation force is applied in an axial direction, the inner cover directly transmits the installation force to the cap nut 76. The webs 84 are optional, and the inner cover simply may have an internal shape that is configured specifically to correspond to and engage the cap nut 76 when the inner cover is secured to the bushing portion 24. The size and shape of the alignment cavity 36 of the inner cover 74 is such that when the cap nut 76 is appropriately positioned within the alignment cavity 36, the cap nut 76 will be appropriately and operatively aligned with the bore 26 of the bushing portion 24, and the screws 78 will retain the inner cover, and thus the cap nut, in operative alignment with the bore, and thus with the axle 16.

The example axle mounting assembly of FIGS. 10-12 also includes an outer cover 80 that is configured to be positioned over and conceal the inner cover. More specifically, the outer cover includes four clips 86 that operatively and securely engage corresponding slots 88 that are defined by the bushing portion 24 and which are perhaps best seen in FIG. 10. The outer cover 80 may be described as being, as mimicking, and/or resembling a hub cap.

FIG. 11 further illustrates the axle mounting assembly 10 together with a corresponding motor assembly 154 operatively coupled to the wheel 20 for selective rotation thereof. The illustrated motor assembly is provided solely as an example, and axle mounting assemblies 10 according to the present disclosure are not required to be used with motorized, or otherwise, powered wheels.

Figure 13:
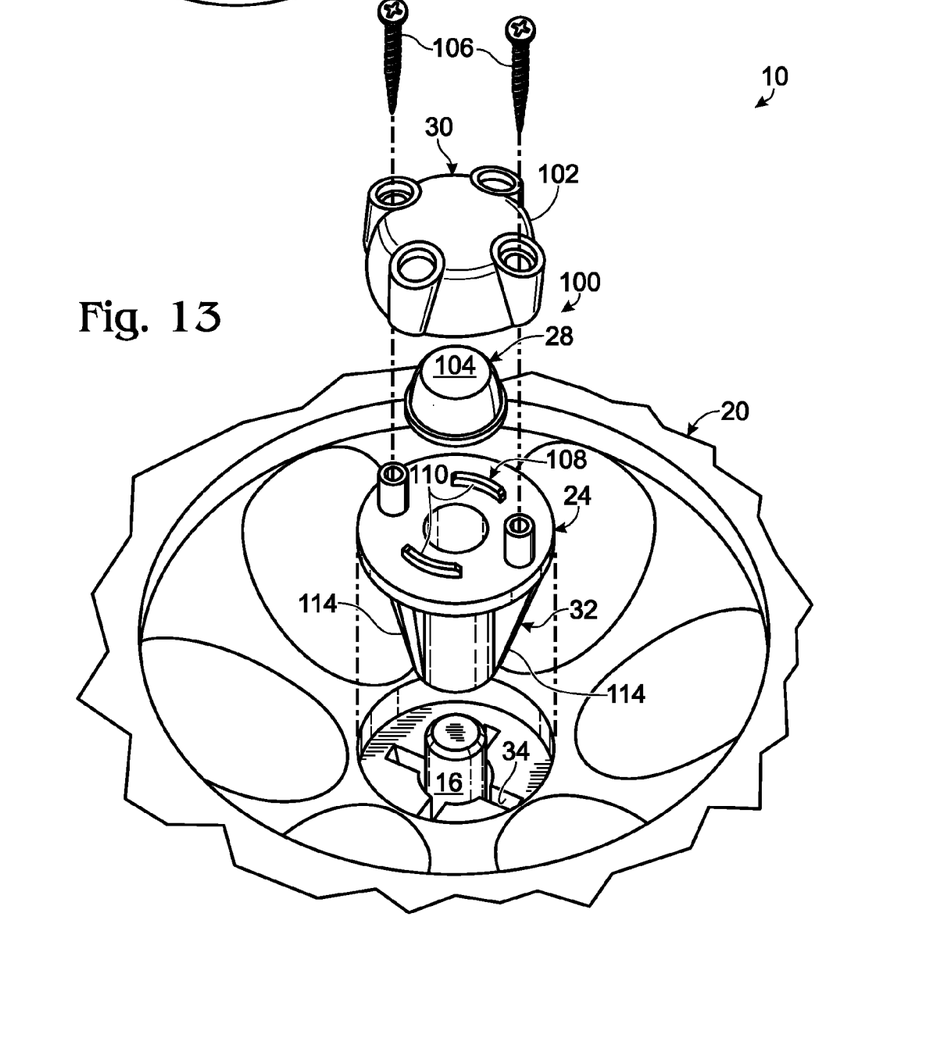
FIG. 13 is an exploded, fragmentary isometric side view of another illustrative, non-exclusive example of an axle mounting assembly according to the present disclosure.
Figure 14:
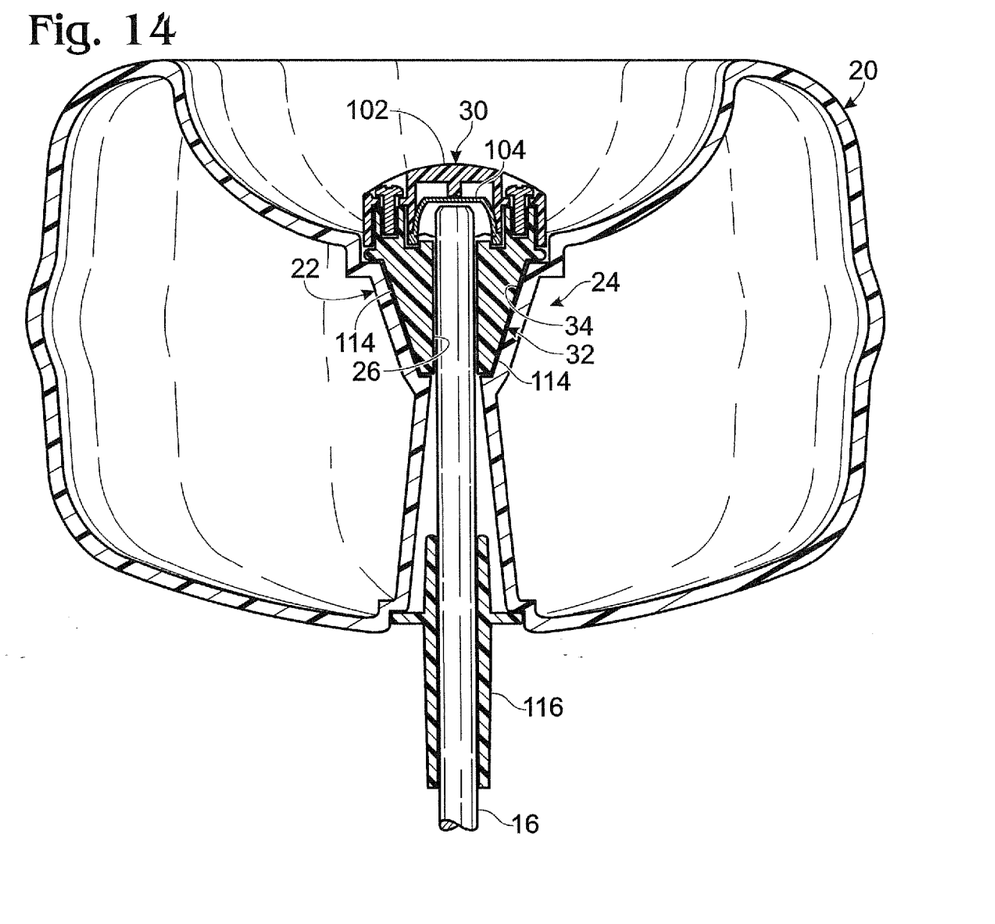
FIG. 14 is a cross-sectional side view of the axle mounting assembly of FIG. 13.
Figure 15:
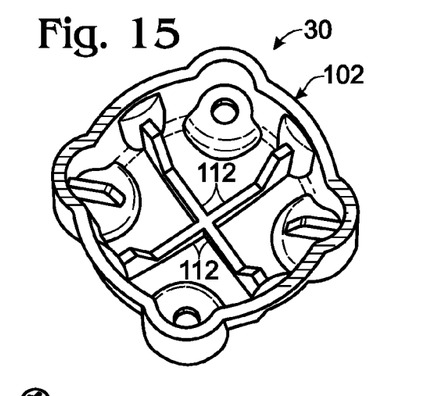
FIG. 15 is an isometric view of an underside of the cover of the cap nut assembly of the axle mounting assembly of FIG. 13.

A third illustrative, non-exclusive example of an axle mounting assembly 10 is illustrated in FIGS. 13-15. The axle mounting assembly of FIGS. 13-15 includes a bushing assembly 14 in the form of a cap nut assembly 100. The cap nut assembly 100 includes a bushing portion 24, an installation-force receiving-portion 30 in the form of a cover 102, a fastener 28 in the form of a cap nut 104, and a pair of screws 106.

The bushing portion 24 of cap nut assembly 100 defines a cap nut alignment retainer 108 in the form of two semi-circular flanges 110 that are sized and shaped to position the cap nut 104 into operative alignment with the bore 26 of the bushing portion 24. Other configurations of cap nut alignment retainers are within the scope of the present disclosure, including those that include only a single or more than two semi-circular flanges 110.

The bushing portion also includes a hub-engagement portion 32 in the form of four radially spaced wings 114 that are configured to engage and mate with corresponding bushing engagement portions 34 of the associated wheel 20.

The cover 102 includes webs 112 that are configured to engage the outer surface of the cap nut 104 when it is positioned by the cap nut alignment retainer 108 and when the cover is operatively secured to the bushing portion 24 with the screws 106. The cover 102 also may be described as defining an alignment cavity 36. The webs 112 are optional, and the cover simply may have an internal shape that is specifically configured to correspond to and engage the cap nut 104 when the cover is secured to the bushing portion 24.

FIG. 14 further illustrates an optional inner hub engagement structure 116 operatively coupled between the wheel 20 and the axle 16, and which may be provided for engagement with a corresponding drive mechanism, such as a motor.

Figure 16:
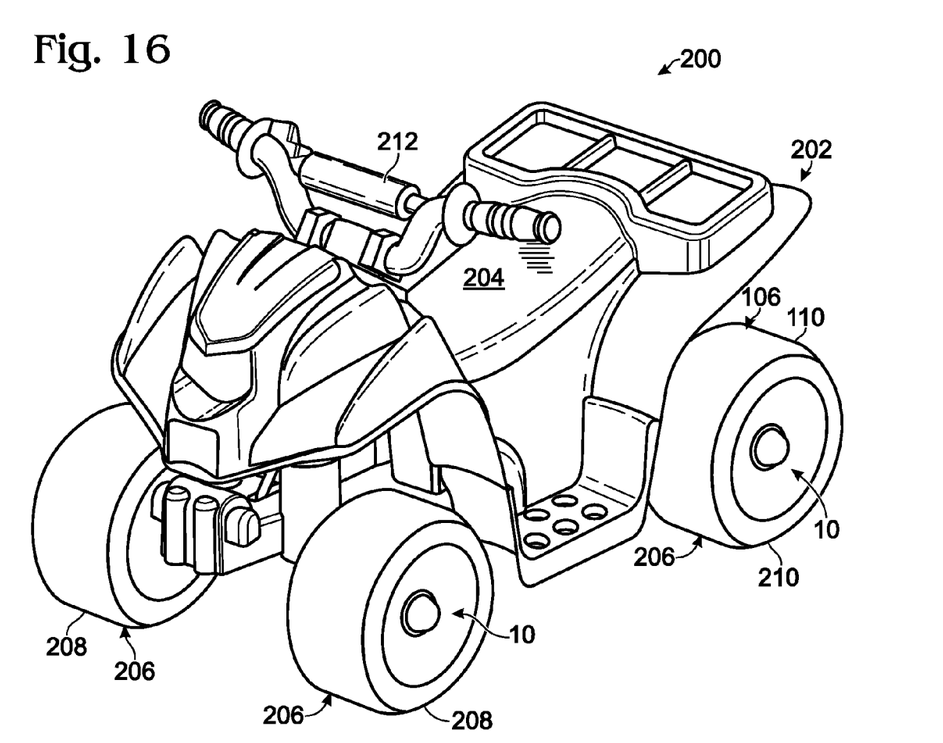
FIG. 16 is an isometric view of an illustrative, non-exclusive example of a children's product in the form of a children's ride-on vehicle that may include at least one of the axle mounting assemblies of the present disclosure.

Turning now to FIG. 16, an illustrative, non-exclusive example of a children's product 12 in the form of a children's ride-on vehicle 200 is illustrated. Children's ride-on vehicle 200 includes a support frame, or body, 202, a child-sized seat 204 that is sized and configured to accommodate at least one child (including a child driver), a plurality of wheels 206 including a pair of steerable wheels 208 and a pair of rear wheels 210, and a steering assembly, with the steering assembly being operatively coupled to the steerable wheels to provide steering inputs thereto. In some embodiments, as discussed herein, children's ride-on vehicles according to the present disclosure, including children's ride-on vehicle 200, may include a battery-powered drive system, including at least one motor, in which case the plurality of wheels 206 may include at least one driven wheel, which in some embodiments may be the rear wheels 210. As used herein, the term "driven wheel" refers to a wheel that is rotated directly in response to a rotational input from the drive assembly.

While children's ride-on vehicle 200 includes four wheels, including two steerable wheels and two rear wheels, which also may be driven wheels, any suitable number of wheels may be included as part of a children's ride-on vehicle according to the present disclosure, including two, three, four, or more than four wheels. Moreover, children's ride-on vehicles according to the present disclosure may be shaped to generally resemble any type of vehicle, including reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like, as well as vehicles that are shaped to resemble fantasy vehicles that do not have a corresponding adult-sized counterpart. Although children's ride-on vehicle 200 is depicted in the form of a four-wheeled all terrain vehicle, the components and/or features of children's ride-on vehicle 200 may be configured for use on and/or with any type of children's ride-on vehicle.

Body 202 typically is formed (at least substantially, if not completely) from molded plastic and may be integrally formed or formed from a plurality of parts that are secured together by screws, bolts, clips, or other suitable fasteners. The body may additionally or alternatively be formed at least partially from other suitable material(s), such as metal, wood, or composite materials. The body may include an underlying frame, or chassis, on which an upper body is mounted. In such an embodiment, the frame is often formed of metal and/or molded plastic, with the upper body formed of molded plastic.

As mentioned, children's ride-on vehicle 200 is an example of children's product 12 according to the present disclosure, and therefore includes at least one (and often several) axle mounting assemblies 10 according to the present disclosure, and may include any of the illustrative, non-exclusive examples of axle mounting assemblies 10 disclosed herein, as well as variants thereof.

Figure 17:
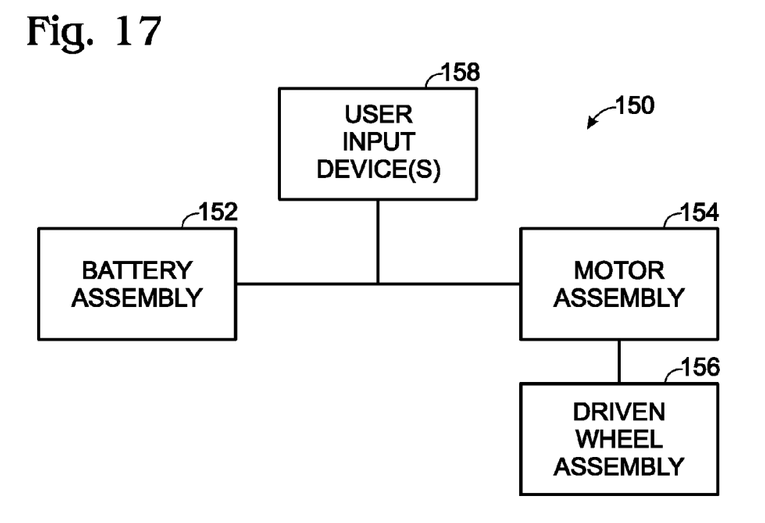
FIG. 17 is a schematic diagram representing battery-powered children's ride-on vehicles according to the present disclosure.

Children's ride-on vehicles according to the present disclosure, including children's ride-on vehicle 200, may be (but are not required to be) powered vehicles. FIG. 17 is a diagram schematically representing optional drive assemblies 150 of children's ride-on vehicles, which optionally may include children's ride-on vehicle 200, and which may be a children's product 12. As schematically represented, a drive assembly may include battery assembly 152, a motor assembly 154 electrically coupled to the battery assembly, a driven wheel assembly 156 coupled to the motor assembly, and one or more user input devices 158.

Battery assembly 152 may include one or more batteries that are adapted to provide power to the motor assembly. The one or more batteries in the battery assembly may have any suitable construction, and in some embodiments may be rechargeable batteries.

Motor assembly 154 includes one or more battery-powered motors that are adapted to drive the rotation of at least one wheel of the driven wheel assembly, which may include one or more driven wheels, depending on the configuration of the children's ride-on vehicle.

User input device(s) 158 are adapted to convey inputs from a child seated on the children's ride-on vehicle to the drive assembly. That is, the input device(s) are configured to convey a user's inputs, such as via a wiring harness, to control the actuation of motor assembly 154, such as by causing the actuation (or energizing) of the motor assembly, selecting between a range of electronic configurations, selecting the direction of rotation of the motor assembly's output, selecting the relative degree to which the motor assembly is actuated, etc. An example of a suitable user input device 158 includes (but is not limited to) a drive actuator, through which a user input directing battery assembly 152 to energize the motor assembly is received. Examples of suitable drive actuators include an on/off switch, a foot pedal, a throttle lever, and a rotational handgrip on a steering mechanism that includes a handlebar. Other illustrative, non-exclusive examples of user input devices include a speed switch, which enables a user to select the relative rate of rotation of the motor assembly's output, and a direction switch, which enables a user to select the relative direction or rotation of the motor assembly and thereby selectively configure the children's ride-on vehicle to drive in a forward or reverse direction. When present, the speed switch and the direction switch may be located in any suitable location on the body or steering assembly of the children's ride-on vehicle for actuation by a child seated on the seat of the children's ride-on vehicle.

Illustrative, non-exclusive examples of children's ride-on vehicles 200 that may include one or more axle mounting assemblies 12 are disclosed in U.S. Pat. Nos. 6,755,265, 6,771,034, 7,568,753, 7,905,305, 7,939,008, and 8,164,429, and in U.S. Patent Application Publication No. 2010/0059968, the disclosures of which are hereby incorporated by reference. In the event that any patents or patent applications are incorporated by reference herein and define a term in a manner and/or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein, the term "and/or" placed between a-first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An axle mounting assembly, comprising:
   an object including a hub;
   an axle extending through the hub and having an end region; and
   a bushing assembly, wherein the bushing assembly includes:
     a bushing portion that extends at least partially through and engages the hub, wherein the bushing portion defines a bore through which the axle extends;
     a fastener operatively retained relative to the bore and positioned around the end region of the axle, wherein the fastener operatively couples the bushing assembly to the axle for rotational movement with the axle or for rotational movement relative to the axle; and
     a force-receiving portion configured to selectively receive an installation force for operatively positioning the fastener over the end region of the axle, wherein the force-receiving portion includes a cover that is removably coupled to the bushing portion and that extends around the fastener.

2. The axle mounting assembly of claim 1, wherein the bushing assembly and the hub are interconnected for rotational movement together with the axle.

3. The axle mounting assembly of claim 1, wherein the bushing portion defines an alignment cavity that is at least partially coextensive with the bore and within which the fastener is positioned, and wherein the alignment cavity includes an opening sized for the fastener to be selectively removed and inserted from the alignment cavity.

4. The axle mounting assembly of claim 3, wherein the bushing assembly includes a projection that extends at least partially across the opening of the alignment cavity to restrict removal of the fastener from the alignment cavity, optionally wherein the projection defines a resilient tab.

5. The axle mounting assembly of claim 4, wherein the alignment cavity is keyed to a shape of the fastener to restrict, or optionally prevent, the fastener from being inserted into the alignment cavity in a non-operable orientation.

6. The axle mounting assembly of claim 1, wherein the cover defines an alignment cavity that is at least partially coextensive with the bore and within which the fastener is positioned, wherein the cover cooperates with the bushing portion to restrict removal of the fastener from the alignment cavity.

7. The axle mounting assembly of claim 1, wherein the cover defines an engagement surface for receiving the installation force for operative positioning of the fastener around the end region of the axle.

8. The axle mounting assembly of claim 7, wherein the engagement surface extends distal the bushing portion and defines a generally planar surface that extends transverse to a longitudinal axis of the axle.

9. The axle mounting assembly of claim 7, wherein the cover is operatively coupled to the bushing portion to transmit the installation force to the bushing portion without directly transmitting the installation force to the fastener.

10. The axle mounting assembly of claim 7, wherein upon receipt of the installation force from a user, the cover is configured to indirectly apply the installation force to the fastener for positioning the fastener around the end region of the axle received in the bore of the bushing portion.

11. The axle mounting assembly of claim 1, wherein the cover does not directly engage the fastener.

12. The axle mounting assembly of claim 1, wherein the cover defines an engagement surface for receiving the installation force, wherein the engagement surface is positioned to directly transmit the installation force to the fastener.

13. The axle mounting assembly of claim 1, wherein the fastener includes a lock washer.

14. The axle mounting assembly of claim 1, wherein the fastener includes a ring having teeth adapted to engage the end region of the axle to retain the fastener around the end region of the axle.

15. The axle mounting assembly of 14, wherein the fastener includes a cap that receives and supports the ring.

16. The axle mounting assembly of claim 1, wherein the fastener includes an integral cap and a lock nut that is sized to engage the end region of the axle to retain the fastener around the end region of the axle.

17. The axle mounting assembly of claim 1, wherein the fastener includes an expandable ring that is biased to constrict around the end region of the axle.

18. The axle mounting assembly of claim 1, wherein the fastener defines an opening through which the end region of the axle extends, and further wherein the fastener engages an outer surface of the end region of the axle to retain the fastener on the end region of the axle.

19. The axle mounting assembly of claim 1, wherein the object includes a wheel, a steering wheel, or a pedal.

20. The axle mounting assembly of claim 1, wherein the bushing portion includes one or more hub engagement portions, wherein the hub defines one or more bushing engagement portions, and wherein the one or more hub engagement portions inter-engage with the one or more bushing engagement portions so that the object is configured to operatively rotate together with the axle and the bushing assembly.

21. The axle mounting assembly of claim 1, wherein the end region of the axle is free of a circumferential groove that extends around the end region of the axle.

22. A children's ride-on vehicle, comprising:
a body;
a seat supported by the body and sized to accommodate at least one child;
a plurality of wheels supported by the body; and
at least one of the axle mounting assembly of claim 1, wherein the at least one of the axle mounting assembly is associated with at least one of the plurality of wheels.

23. An axle mounting assembly, comprising:
an object including a hub;
an axle extending through the hub and having an end region; and
a bushing assembly, wherein the bushing assembly includes:
a bushing portion that extends at least partially through and engages the hub, wherein the bushing portion defines a bore through which the axle extends;
a fastener operatively retained relative to the bore and positioned around the end region of the axle, wherein the fastener operatively couples the bushing assembly to the axle for rotational movement with the axle or for rotational movement relative to the axle; and
a force-receiving portion configured to selectively receive and indirectly transmit an installation force to the fastener for operatively positioning the fastener over the end region of the axle.

24. The axle mounting assembly of claim 23, wherein the force-receiving portion includes a cover that is coupled to the bushing portion, wherein the cover defines an engagement surface for receiving the installation force, and wherein the cover does not directly engage the fastener.

* * * * *